3,641,024
LOW MOLECULAR WEIGHT POLYISOCYANATES
Perry A. Argabright, Littleton, Colo., and Harold D. Rider, Barrington, Ill., assignors to Marathon Oil Company, Findlay, Ohio
No Drawing. Filed Nov. 1, 1968, Ser. No. 772,860
Int. Cl. C07d 55/38
U.S. Cl. 260—248
21 Claims

ABSTRACT OF THE DISCLOSURE

Polyisocyanate product mixture compounds are separated into a relatively low molecular weight phase and a relatively high molecular weight phase by contacting the product mixture with carbon tetrachloride. The solvent is readily removed for final isolation of the two polyisocyanate components. The polyisocyanate compositions are useful as starting materials in the production of urethane polymers as coatings, films, foams, adhesives, etc. The higher molecular weight products are especially useful in these areas because of their inherent thermostability and flame retardancy provided by the high concentration of isocyanurate rings in the molecule.

CROSS REFERENCES TO RELATED APPLICATIONS

U.S. patent application Ser. No. 611,588, filed Jan. 25, 1967, now U.S. Pat. No. 3,458,448, and assigned to the assignee of the present invention, relates to the preparation of the polyisocyanate reaction product mixtures which are uniquely separated by the process of the instant invention. This process of preparation of the mixtures is disclosed herein for purposes of convenience.

BACKGROUND OF THE INVENTION

Polyisocyanates, particularly toluene diisocyanate (TDI) are widely used in the production of polyurethane polymers such as coatings, films, foams, adhesives and elastomers for example. Urethane polymers offer advantages wherever superior resistance to abrasion, acid, alkali, and weather is required. The significant disadvantage of presently available urethane compositions has been their tendency to discolor (yellowing) and degrade when exposed to sunlight and the elements.

DESCRIPTION OF THE INVENTION

The present invention involves a method of separation of mixtures of polyisocyanates. A preferred method of production of these mixtures is more fully described in copending application Ser. No. 611,588, referred to above, now U.S. Pat. No. 3,458,448, where the polyisocyanates are products in which the nitrogen of the isocyanate radical (—N=C=O) is not attached to an aromatic ring. It has been discovered that polymers derived from isocyanates having this special molecular characteristic are markedly less subject to degradation and yellowing than are the polymers produced from conventional isocyanates in which the nitrogen is attached to an aromatic ring. These polyisocyanates contain at least about 0.1 and preferably from 10 to about 75 mole percent (based on the total moles of nitrogen in the compositions) of isocyanurate groups which have been discovered to render additional stability and resistance to degradation of finished polymers.

In general, this invention involves the production of a mixture of polyisocyanates by the reaction of an organic dichloride with a metal cyanate in the presence of a metal halide, preferably an iodide or bromide using an aprotic solvent as defined herein; the relatively low molecular weight polyisocyanates are separated from the higher molecular weight polyisocyanates in the product mixture by contact with carbon tetrachloride which separates the different molecular weight isocyanates into two distinct phases (low molecular weight products in CCl₄; higher molecular weight products in CCl₄ insoluble phase) which are thereafter sepaarted. The overall reaction producing the polyisocyanate mixture may be generally summarized as follows:

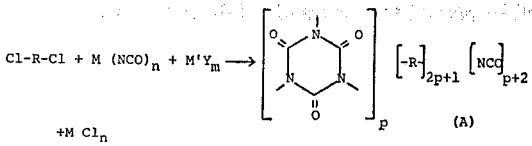

where:
N—N bonds are not present;
R=Divalent alkyl or substituted divalent alkyl, for example:

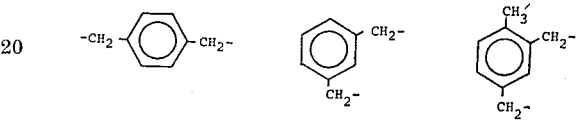

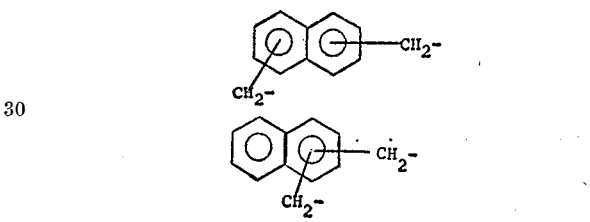

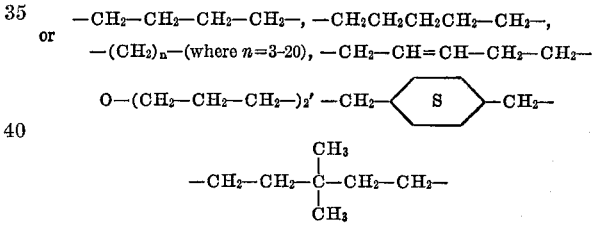

—CH₂—CH₂—CH₂—CH₂—, —CH₂CH₂CH₂CH₂—CH₂—,
or
—(CH₂)ₙ—(where n=3-20), —CH₂—CH=CH—CH₂—CH₂—

O—(CH₂—CH₂—CH₂—)₂′ —CH₂—⟨S⟩—CH₂—

—CH₂—CH₂—C(CH₃)(CH₃)—CH₂—CH₂— the methyl derivatives of the foregoing etc.;

M=alkali or alkaline earth metal, for example Li, Na, K, Rb, Cs, Be, Mg, Ca, etc.
n=Oxidation number of metal M
M′=A metal, preferably an alkali or alkaline earth metal.
Y=A very reactive nucleophile, for example I or Br
m=oxidation state of the metal M′ p may be varied from 0 to over 15, but will preferably be from 0 to about 6 in order to produce a mixture of the most desirable isocyanurate-containing polyisocyanates of the present invention. The average value of p may be controlled by utilizing greater or lesser concentrations of the halide catalyst.

By aprotic solvents is meant compositions which are liquid under the conditions of the reaction, which have a high dielectric constant, (greater than about 15 at 25° C.), which are dipolar, that is, one part of the molecule has a more positive electrical charge relative to the other parts of the molecule causing the molecule to act as a dipole, are sufficiently inert not to enter into deleterious side reactions to a signficant degree under the reaction conditions and which do not possess hydrogen atoms capsule of hydrogen bonding with or transferring to anions in solution in the reaction mixture. The aprotic solvent can be composed of a mixture of liquids so long as the overall liquid compositions meet the above criteria. Preferred among the aprotic solvents are N-alkyl pyrrolidones (e.g.

N-methylpyrrolidone), dialkyl formamides, [e.g. N,N-dimethylformamide (DMF), and N,N-dimethylacetamide] nitriles (e.g. acetonitrile), hexaalkylphosphoramides (e.g. hexamethylphosphoramide) and tetraalkylureas (e.g. tetramethyl urea), dialkyl sulfoxides (e.g. dimethylsulfoxide), dialkyl sulfones (e.g. dimethylsulfone), especially those in which the alkyl groups are methyl groups. The most preferred solvent for the reaction of the present invention is DMF. Preferably from about 5 to about 100 and most preferably from about 10 to about 50 moles of the solvent will be present for each mole of dihalide starting material.

By relatively low molecular weight polyisocyanates are meant polyisocyanate compositions made in accordance with this invention where the value of $p$ is 0 or 1. For example, when the dichloride reactant is p-xylylene dichloride, then the relatively low molecular weight polyisocyanates which are selectively carbon tetrachloride soluble consist principally of the compounds p-isocyanoatomethylbenzyl chloride byproducts (I), p-xylylene diisocyanate product (II), and tris(1,3,5-p-isocyanatomethyl) benzylisocyanurate product (III) whose structures are given below:

(I)

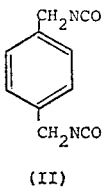
(II)

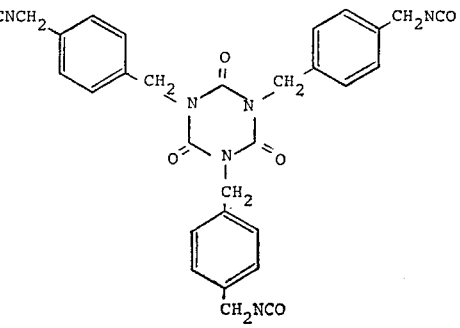
(III)

The ratio of MNCO to chloride in the dichloride is preferably from 0.8 to about 1.5 and most preferably from 1.00 to about 1.10, by weight.

The most preferred dichlorides are taken from the class of:

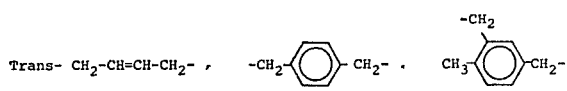

hexamethylene, and their substituted derivates.

The reaction is preferably conducted at a temperature of from about 25 to about 300°, and most preferably of from 50 to about 150° C. Pressure is not narrowly critical and may be from below one atomsphere to over 10,000 p.s.i.g. In most cases, it will be preferable to conduct the reaction in the absence of water on a batch-type basis, although flow systems may be utilized. The most convenient apparatus will, in most cases, be a conventional tight-lid varnish cooker or similar reactor having a reflux condenser, provision for agitation, and the usual controls for temperature and pressure.

In general, commercial grades of starting materials will be satisfactory for the reaction of the present invention, but anhydrous starting materials (containing less than about 1% and preferably less than about 0.5% by weight of water) will be preferred.

Although the polyisocyanate mixtures to be separated by the process of this invention are preferably prepared by the foregoing method according to our copending application, this method is by no means the only method of preparing polyisocyanate mixtures susceptible to carbon tetrachloride extraction according to our invention. Any conventional method of preparing a mixture of polyisocyanates having a structure the same as or similar to (A) above may be employed. For instance, TDI may be treated with a basic catalyst, exemplified by sodium acetate, pyridine, sodium methoxide, etc., whereby the trimerization reaction of the diisocyanate takes place forming a mixture of isocyanurate-containing polyisocyanates. Various other di- or tri-substituted isocyanates may be utilized such as 2,4-bis(isocyanatomethyl)toluene. One well known method of forming diisocyanates involves treating, say, p-xylylene dichloride with ammonia to form the diamine and then treating the diamine with phosgene to form p-xylylene diisocyantte, which then upon base catalysis forms the desired mixture of isocyanurate-containing polyisocyanates. Various other methods are well known to those skilled in the art.

By relatively high molecular weight polyisocyanates are meant those compounds in which the value of $p$ is 2 or greater. Although we have found that carbon tetrachloride is very selective in dissolving the relatively low molecular weight polyisocyanates, minor amounts of the heavier materials may be extracted with the lighter materials, as well as minor amounts of the relatively low molecular weight polyisocyanates may be left unextracted in the insoluble lower layer. Further extractions may be desired if extreme resolution is required.

The surprising feature of our invention is the uniqueness and selectivity of the solvent used to extract and separate the relatively low molecular weight polyisocyanates from the relatively high molecular weight polyisocyanates. We have found that carbon tetrachloride is unique as an extractant. Other solvents are inoperative, exemplified by paraffins, (e.g. n-heptane) in which the product mixture is completely insoluble, aromatics (e.g. benzene), other halogenated $C_1$ hydrocarbons (e.g. $CHCl_3$) and ketones (e.g. acetones) in which the product mixture is *completely* soluble and alcohols (e.g. ethanol) which react with the components of the product mixture to form urethanes.

In accordance with the process of this invention, the polyisocyanate product mixture is intimately contacted with carbon tetrachloride in a suitable apparatus for such intimate contacting, as for example, in a high speed stirring mechanism (e.g. dispersator) or in a thin layer extraction apparatus. Preferably, for every volume of polyisocyanate present, from about 0.5 to about 1000, more preferably from about 1 to about 100 and most preferably from about 2 to about 50 volumes of carbon tetrachloride are employed. The temperature during the extraction step should be such as to maintain liquid conditions, that is, prevention of evaporation of any of the components, especially carbon tetrachloride. Preferred temperature ranges are from 0° to about 200° C., but more preferably 10 to about 125 and most preferably from 20 to about 40° C. Pressure is not narrowly critical during extraction and may in general range from less than one to about 100 atmospheres and more preferably from about 1 to about 10 atmospheres, with atmospheric pressures being advantageously employed at the lower temperatures.

Once the product mixture has been thoroughly contacted with the carbon tetrachloride solvent, the mixture is allowed to settle and immediately two distinct phases separate, one phase containing relatively low molecular weight polyisocyanates dissolved in carbon tetrachloride, and the other phase containing substantially the relatively heavy polyisocyanates with residual amounts of carbon tetrachloride present. The phases are then separated, as by decantation, filtration, centrifugation, or other solid-liquid extraction method, and the carbon tetrachloride is evaporated off yielding low molecular weight polyisocyanates. The residual carbon tetrachloride present in the insoluble heavier component may be removed by heating in a vacuum oven at from 50 to about 100° C. for approximately from about 1 to about 24 hours. For storage purposes, this material is preferably ground up and placed in a watertight container.

Although this invention has been described on a batch basis, continuous flow conditions, utilizing a series of extractors, solvent strippers, etc. may be employed if desired. The following examples are illustrative of the preferred embodiment of this invention but are not meant to limit it in any way. A variety of modifications and variations will become obvious to those skilled in the art upon a reading of the present application, and all such obvious variations and modifications are to be taken as being within the scope of the claims appended hereto.

EXAMPLE 1

Preparation of polyisocyanate mixture

To a 10 gallon Pfaudler reactor is charged 2,447 g. (36 moles) NaNCO, 556 g. (5.4 moles) NaBr, and 5 gallons DMF (purified via distillation from $CaH_2$) in a nitrogen atmosphere and the mixture is heated at 140° C. for one hour and twenty minutes. To the reactor is added 3,150 g. (18 moles) p-xylylene dichloride. The reaction is run for 15 minutes at 140–150° C. after addition. The reaction is then cooled to room temperature, filtered, stripped of DMF. At this point benzene is added to the residue and the resulting mixture filtered to remove trace amounts of inorganic salts. The filtrate, containing the polyisocyanate product, is stored under nitrogen.

Four similar runs are made, and the products blended together, refiltered, and stripped on a flash evaporator. The polyisocyanate blend has an isocyanate content of 5.74 meq. NCO/g., specific gravity of 1.268, and contains 1.85 weight percent DMF.

EXAMPLE 2

1,342 g. of the polyisocyanate prepared in Example 1 are placed in a 5 liter Morton flask fitted with a dispersator. Three liters of carbon tetrachloride are added and the mixture stirred at 10,000 r.p.m. for 30 minutes. The phases are separated and the carbon tetrachloride evaporated to yield 400 g. of the lower molecular weight materials, p-isocyanatomethylbenzylchloride (I), p-xylylene diisocyanate (II), and tris(p-isocyanatomethyl) benzylisocyanurate (III) (referred to hereinabove), with an NCO content of 7.5 meq./gm. This is 29.9 weight percent of the starting material. The higher molecular weight material ($CCl_4$ insoluble) having an NCO content of 3.9 meq./gm. is dried by heating in a vacuum oven at 80° C. for 7 hours and a gas-liquid chromatograph analysis is run on both the heavy and light polyisocyanate products. The carbon tetrachloride-soluble material contains about 6% I, 34% II, and 60% III, by weight. The carbon tetrachloride insoluble material is about 95+% (by weight) high isocyanurate (P>1) containing polymeric isocyanates.

EXAMPLE 3

70.8 g. of the p-xylylene based polyisocyanate prepared in Example 1 and 200 ml. of carbon tetrachloride are placed in a 500 ml. round flask. This is then rotated at 100 r.p.m. for 18 hours. The two distinct phases which form are separated and the carbon tetrachloride evaporated off to yield 22.5 g. of extracted material. This accounts for 32 weight percent of the starting material. The residual carbon tetrachloride is removed from the heavies by heating in a vacuum oven at 80° C. for 6 hours. The material is then pulverized and stored in a water-tight container.

EXAMPLE 4

To illustrate the criticality of using carbon tetrachloride in our invention, the same procedure is used as in Example 2 except that the following solvents are used in place of $CCl_4$ with the results given opposite the solvent:

| Solvent | Results |
| --- | --- |
| n-Heptane | } Product mixture completely insoluble. |
| n-Hexane | |
| Benzene | } Product mixture completely soluble. |
| Trichloromethane | |
| Acetone | |
| Chloroform | |
| Ethanol | } Product mixture reacts with "solvent" to form urethanes. |
| Isopropanol | |

What is claimed is:

1. A process for the separation of relatively low molecular weight polyisocyanates from a mixture comprising said lower molecular weight polyisocyanates and relatively high molecular weight polyisocyanates containing isocyanurate rings, comprising extracting out the said low molecular weight polyisocyanates with carbon tetrachloride.

2. The process of claim 1 wherein the mixture of polyisocyanates is intimately contacted with carbon tetrachloride to yield two phases: a carbon tetrachloride phase containing the low molecular weight fraction of the product and a carbon tetrachloride insoluble phase in which the higher molecular weight fraction predominates.

3. The process of claim 2 wherein the extraction apparatus for intimate contact is selected from the group consisting of a high speed stirring mechanism and a thin layer extraction apparatus.

4. The process of claim 1 wherein the polyisocyanates have the structure

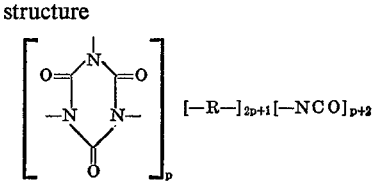

in which N—N bonds are absent and where R is selected from the group consisting of divalent alkyl and substituted divalent alkyl and where $p$ is an integer from 0 to over 15.

5. In a process for the preparation of a mixture of relatively low molecular weight polyisocyanates and relatively high molecular weight polyisocyanates containing isocyanurate rings and separation of the relatively low molecular weight polyisocyanates from the mixture by reacting an organic dichloride with a metal cyanate in the conjoint presence of a bromide or iodide catalyst and an aprotic solvent to form a product mixture, the improvement comprising:

(a) extracting the relatively low molecular weight polyisocyanates by contacting said product mixture with carbon tetrachloride to form a first phase rich in low molecular weight polyisocyanates and a second phase rich in high molecular weight polyisocyanates, and thereafter, (b) separating the phases and isolating the low molecular weight polyisocyanates from the high molecular weight polyisocyanates.

6. The process of claim 5 wherein the reaction is conducted at a temperature of from about 25 to about 300° C. and where the metal cyanate is the cyanate of a metal selected from the group consisting of Li, Na, K, Rb, Cs, Ca, Mg, and Be.

7. The process of claim 5 wherein the dichloride is an unsaturated dichloride in which the chlorines are allylic or benzylic to the unsaturation and wherein the catalyst is a metal bromide, a metal iodide or a metal bromide-iodide.

8. The process of claim 5 wherein the dichloride is 2,4 bis(chloromethyl) toluene.

9. The process of claim 1 wherein the catalyst is an alkali metal halide or an alkaline earth metal halide.

10. The process of claim 1 wherein the catalyst is selected from the group consisting of sodium iodide, sodium bromide, potassium iodide, potassium bromide and mixtures thereof.

11. The process of claim 7 wherein the catalyst is an alkali metal halide or an alkaline earth metal halide.

12. The process of claim 9 wherein the catalyst is selected from the group consisting of sodium iodide, sodium bromide, potassium iodide, potassium bromide and mixtures thereof.

13. The process of claim 12 wherein the aprotic solvent is selected from the group consisting of dialkyl amides (e.g. N,N-dimethylformamide and N,N-dimethylacetamide) nitriles (e.g. acetonitrile), N-alkylpyrrolidones (e.g. N-methyl pyrrolidone) hexaalkylphosphoramides (e.g. hexamethylphosphoramide), tetraalkylureas (e.g. tetramethylurea), disubstituted sulfoxides (e.g. dimethyl sulfoxide) and sulfones (e.g. dimethyl sulfone).

14. The process of claim 13 wherein the aprotic solvent comprises a major portion of N,N-dimethylformamide.

15. The process of claim 13 wherein there are present from about 10 to about 100 moles of aprotic solvent for each mole of dihalide starting material.

16. In a process for the preparation of a mixture of relatively low molecular weight polyisocyanates and relatively high molecular weight polyisocyanates containing isocyanurate rings and separation of the relatively low molecular weight polyisocyanates from the mixture by reacting divalent alkyl or substituted divalent alkyl dichloride with an alkali metal or alkaline earth metal cyanate in the conjoint presence of a bromide or iodide catalyst and dimethylformamide to form a product mixture, the improvement comprising:

(a) extracting the relatively low molecular weight polyisocyanates by contacting said product mixture with carbon tetrachloride to form a first phase rich in low molecular weight polyisocyanates and a second phase rich in high molecular weight polyisocyanates, and thereafter, (b) separating the phases and isolating the low molecular weight polyisocyanates from the high molecular weight polyisocyanates.

17. The process of claim 16 wherein the divalent alkyl dichloride is xylylene dichloride.

18. The process of claim 16 wherein the divalent alkyl dichloride is 2,4 bis(chloromethyl) toluene.

19. The process of claim 16 wherein the metal cyanate is sodium cyanate.

20. The process of claim 16 wherein the catalyst is NaBr.

21. The process of claim 16 wherein the carbon tetrachloride is removed from the first phase by heating to evaporation.

References Cited

UNITED STATES PATENTS 3,440,270    4/1969    McMaster et al. _____ 260—453

FOREIGN PATENTS 737,487    9/1955    Great Britain _____ 260—453
930,458    7/1963    Great Britain _____ 260—453
1,034,152  6/1966    Great Britain _____ 260—453

JOHN M. FORD, Primary Examiner

U.S. Cl. X.R.

260—453, 77.5; 252—77; 117—136